Patented Dec. 17, 1929

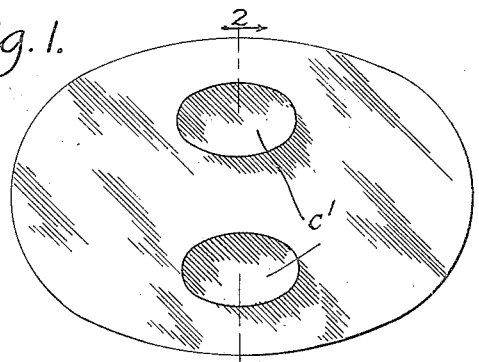
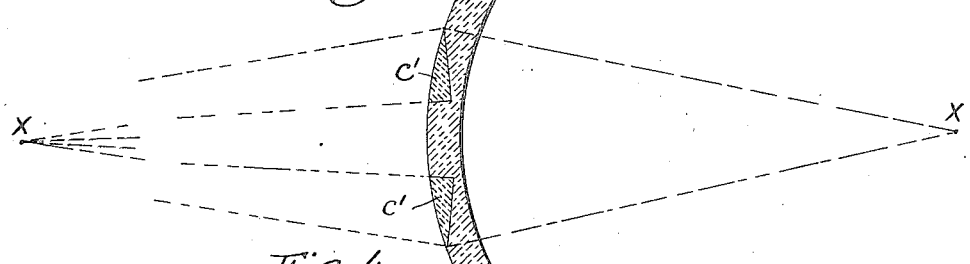
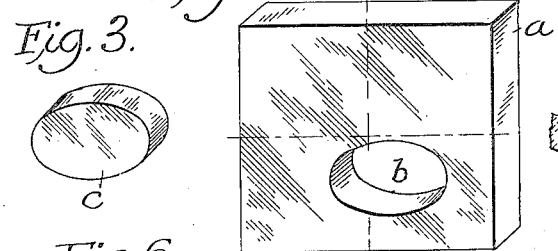
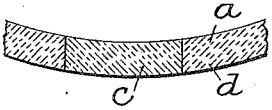
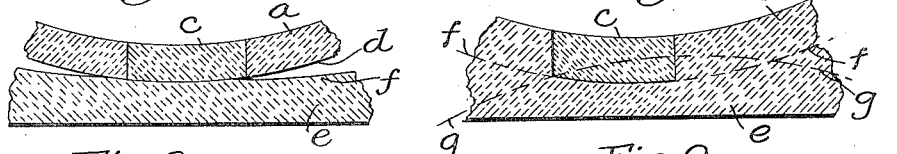
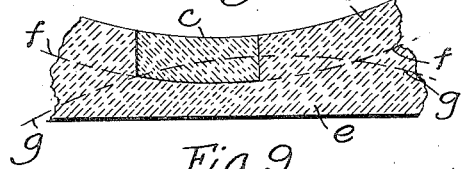
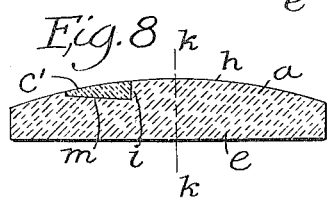
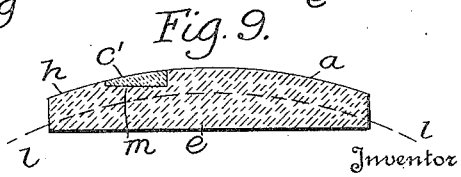

1,740,298

UNITED STATES PATENT OFFICE

JAMES H. HAMMON, OF VINCENNES, INDIANA

SPECTACLE LENS

Application filed April 6, 1927. Serial No. 181,557. REISSUED

My invention relates to multi-focal spectacle lenses, and has for its object to produce a spectacle lens for those people who require different correction for distance and for near vision, in lenses having continuous front and back surfaces.

My improvement consists in making such continuous surfaced lenses so that the user when looking through them and changing from distant to near vision and vice versa shall see no apparent displacement or jump of the object viewed.

My improvement further consists in making the portion used for near vision a prism whose base or thicker portion is directed toward the centre of the lens.

I shall explain my invention with reference to the drawings, in which like parts are similarly designated and in which—

Figure 1 is an elevation illustrating a spectacle lens such as used by paper-hangers and others who require near vision both when looking up and down.

Fig. 2 is a section on line 2—2 of Figure 1.

Fig. 3 shows the button.

Fig. 4 the major portion of the blank having a perforation in which the button fits.

Fig. 5 is a section showing the button fused in the perforation and the lower face of the major portion polished.

Fig. 6 is a secton showing the major portion and button superimposed on a third polished surface of proper curvature preparatory to fusing.

Fig. 7 is a cross section of a fused blank.

Fig. 8 is a cross section of a finished blank after polishing one surface.

Fig. 9 shows how the opposite surface is cut by the optician.

I first take a flat piece of crown glass $a$ that is to form the main portion of the lens blank, perforate it and polish the walls of the perforation $b$. I then insert in this perforation $b$ what is termed in the trade a button $c$ whose sides are also preferably polished and fit the perforation. This button $c$ has a different index of refraction than the piece $a$. They may then be fused together.

This procedure of fastening a button in a perforation by fusing or otherwise is well known.

I then heat the glass to soften it and press or mold this compound portion, thereby fusing it into one piece, to approximate shape and polish one face, as the face $d$, Fig. 5, which preferably but not necessarily is of lesser radius than a third or cover portion $e$ of the blank.

The cover portion $e$ of the blank is a glass having the same index of refraction as the crown portion or approximately the same, and its one surface $f$ is ground and polished to the proper surface or curvature for giving to the surface of the button that shape or curvature required by one end $m$ of the button that is to have prismatic shape when the lens is finished and that is to be covered by the portion $e$.

The assemblage is then fused together, producing the composite piece of fused glass illustrated in Figure 7.

From this composite piece the commercial blank is ground along a line, as $g$—$g$, for example, to the proper curvature or diopter for one face of the blank, and this face is then polished, giving one polished face $h$ of continuous or unbroken surface and leaving a portion of the button $c$ in the form of a prism $c'$ whose one face $m$ is covered by the glass of the portion $e$ and its thicker portion or base $i$ is directed toward the centre or geometrical axis $k$—$k$ of the finished lens to be ground from such blank.

In this form the blank is sold to the optician who, knowing the power or diopeter of both the prism $c'$ and polished surface $h$, then grinds and polishes the other surface of the blank to that diopeter that shall be combined with the diopeter of the other surface, as $h$, to give the required correction for the wearer of the spectacles.

By such a construction all the surfaces of the lens, i. e., front and rear surfaces of the prism $c'$ may have a common axis, as $x$—$x$, Fig. 2. This will, of course, be so in all cases except when the one face of the prism $c'$ is a plane, in which case its plane or flat side will be at right angles to this axis, but the thicker base $i$ will in all cases be directed toward the centre of the finished lens.

Of course it is understood that what opticians understand to be a prism may have curved or spherical surfaces, or flat surfaces or both flat and curved surfaces, in other words it may be considered a sort of lens, in which the geometrical and optical centres of the prism do not coincide.

Preferably and usually the thicker base of the prism will be perpendicular to the exposed face of the prism.

I claim—

1. A multi-focal fused spectacle lens having a major perforated portion surrounded by the major portion and a fused insert portion both fused to a third portion of substantially the same glass as the major portion, said insert portion forming a prism having the same cross sectional area as the perforation covered by the third portion.

2. A multi-focal fused spectacle lens having a major perforated portion and a fused insert portion both ground and polished, and a third portion ground and polished to the required surface and of substantially the same glass as the major portion surrounded by the major portion and, said insert portion forming a prism covered by said third portion on one face and having its opposite exposed face of the same shape as the corresponding portion of the lens with the area of the insert portion of the same cross section as the perforation.

3. A multi-focal fused spectacle lens having a major perforated portion and a fused insert portion both ground and polished, and a third portion fused thereto ground and polished to the required surface and of substantially the same glass as the major portion, said insert portion forming a prism covered by the third portion surrounded by the major portion, and the outer, exposed face of said prism conforming to the outer surface of the lens and of the same area as the cross section of the perforation.

4. A multi-focal fused spectacle lens having a major perforated portion surrounded by the major portion, a fused insert portion, and fused thereto a third portion covering the insert portion, said insert portion forming a prism whose base is directed toward the centre of the lens and whose outline is determined by, and of the same size as the perforation.

5. A multi-focal spectacle lens having a major perforation portion, and a prism inserted in and surrounded by said portion having its base toward the centre of the lens and having one face concentric with the face of the lens, and a covering for the prism of substantially the same index of refraction as said major portion and the outline of said insert portion determined as to size and contour by the perforation.

6. A multi-focal fused spectacle lens blank having a button fused in a perforation therein of prismatic shape with the base toward the centre of the blank, said blank having one continuous ground and polished surface including the button and the opposite face of the blank fused to a layer of glass that covers the button.

7. The method of making a fused multifocal lens, which comprises fusing a button in an opening through a portion of a blank to form a composite blank, grinding and polishing a companion blank to the desired surface, fusing the composite blank onto the polished surface of the companion blank so as to cover the button, and forming a lens from the blank.

8. The method of making a fused multifocal lens, which comprises fusing a polished button in an opening through a portion of a blank to form a composite blank, pressing the composite blank to approximate surface curvature and grinding and polishing one face of the composite blank, fusing the polished face of the composite blank to a polished surface of a companion blank whose polished face has the surface desired.

9. A multi-focal fused spectacle blank having a major portion having a perforation therethrough with straight walls from end to end thereof, a button corresponding in shape to said perforation and fitted and fused therein, a companion blank to which one face of said major button portion is fused and the opposite face of said major portion being finished.

10. A multifocal fused spectacle lens having a major portion with a perforation therethrough having different rectangular dimensions in cross section and an inserted portion fused in the perforation, a companion glass to which said major portion and inserted portion are fused and of the same kind of glass as the major portion.

11. The method of making a fused multifocal lens, which comprises fitting a button of one index of refraction into a perforation in a major blank of a different index of refraction, fusing the button into the blank, grinding the lower face of the blank to give the end of the button a proper curvature, fusing the ground surface to a glass, and grinding and polishing the exposed face of the major blank including the exposed face of the button, said button determining the size and shape of the insert portion of the finished lens.

In testimony that I claim the foregoing as my invention, I have signed my name hereto.

JAMES H. HAMMON.